United States Patent Office 2,786,844
Patented Mar. 26, 1957

2,786,844

PROCESS OF PREPARING RESERPIC ACID ESTERS

Harold B. MacPhillamy, Madison, and Charles F. Huebner, Chatham, N. J., assignors to Ciba Pharmaceutical Products, Inc., Summit, N. J., a corporation of New Jersey No Drawing. Application August 25, 1953,
Serial No. 376,523

8 Claims. (Cl. 260—287)

This application relates to a novel process for producing methyl reserpate and other alkyl reserpates from reserpine.

In the applications of Emil Schlittler, Serial No. 353,920, filed May 8, 1953, and Serial No. 361,879, filed June 15, 1953, there is disclosed a process which comprises subjecting reserpine to alkaline hydrolysis to form reserpic acid and then esterifying the reserpic acid with diazomethane and other diazoalkanes to form methyl reserpate and other alkyl reserpates. In the application of Emil Schlittler, Serial No. 3773,461, filed August 10, 1953, there is disclosed a process for converting alkyl reserpates into valuable esters thereof having sedative and hypotensive action. According to the present invention, it has now been found that methyl reserpate and other alkyl reserpates can be directly obtained from reserpine when the reserpine is subjected to alcoholysis or ester interchange with an alkanol, for instance, with an excess of the alkanol in the presence of an ester interchange catalyst, e. g., an alkali metal alkanolate, sodium carbonate, piperidine or aluminum tertiary butoxide, under substantially anhydrous conditions. Thus, when an excess of methanol is employed, for example, in the presence of sodium methanolate, methyl reserpate is obtained in good yields. As disclosed in the aforesaid application, methyl reserpate has the empirical formula:

$C_{23}H_{30}O_5N_2$

The reserpine employed as the starting material in the process can be obtained from plants of the Rauwolfia species, more particularly Rauwolfia serpentina Benth, according to the process described in the application of Emil Schlittler and Johannes Mueller, Serial No. 367,357, filed July 10, 1953, now Patent No. 2,752,351. Reserpine is also described by Johannes Mueller et al. in Experientia, VIII/9, 339 (1952).

The following examples will serve to illustrate the invention. The relationship of the parts by weight to the parts by volume being as the gram to the milliliter.

Example 1

To 50 parts by volume of anhydrous methanol was added 0.1 part by weight of metallic sodium and when the ensuing reaction had ceased, 1.0 part by weight of reserpine was suspended in the solution. The mixture was refluxed for three hours during which time the material gradually dissolved. The solution was then concentrated in vacuo at 40–50° C. to about 15 parts by volume and 50 parts by volume of water were then added. The pH of the solution was adjusted to 4.5–5 by the addition of 10% sulfuric acid. The resulting acid solution was extracted three times with 50 parts by volume portions of ether. The aqueous phase was then made alkaline with concentrated ammonia and the precipitated material taken up in chloroform. The chloroform solution was washed with water, dried and the solvent removed. The resulting oil crystallized and was identified as methyl reserpate. It melted at 236–238° C. after recrystallization from ethyl acetate.

Example 2

By following the same procedure as in Example 1 and using the same amounts of reagents, but employing dry ethanol, there is obtained an oily material comprising ethyl reserpate.

Example 3

By following the same procedure as in Example 1 and using the same amounts of reagents, but employing dry butanol, there is obtained an oily material comprising butyl reserpate.

Example 4

A suspension of 1 part by weight of reserpine in 50 parts by volume absolute methanol containing 6 drops of dried piperidine was refluxed 10 hours. The solution was cooled and filtered. The filtrate was concentrated to 15 parts by volume, diluted with 50 parts by volume water, and its pH adjusted to 4.5–5 by the addition of sulfuric acid. It was then extracted with ether and the aqueous phase was then made alkaline with concentrated ammonium hydroxide. The chloroform extract was washed until neutral, dried, and concentrated. The resulting oil crystallized upon the addition of a small amount of methanol and yielded methyl reserpate.

Example 5

A suspension of 1 part by weight reserpine and 0.1 part by weight aluminum tertiary butoxide in 50 parts by volume of absolute methanol was refluxed 12 hours. It was then cooled and filtered. The filtrate was concentrated to 15 parts by volume, diluted with 50 parts by volume of water, its pH adjusted to 4.5–5 by the addition of sulfuric acid, and extracted with ether. The aqueous phase was made alkaline with concentrated ammonium hydroxide and extracted with chloroform. The chloroform extract was washed until neutral, dried and concentrated. The resulting oil crystallized upon the addition of a small amount of methanol and yielded methyl reserpate.

Example 6

A suspension of 1 part by weight reserpine and 0.1 part by weight sodium carbonate in 50 parts by volume of absolute methanol was refluxed 6 hours. It was then cooled and filtered. The filtrate was concentrated to 15 parts by volume, diluted with 50 parts by volume water, its pH adjusted to 4.5–5 by the addition of sulfuric acid, and extracted with ether. The aqueous phase was made alkaline with concentrated ammonium hydroxide and extracted with chloroform. The chloroform extract was washed until neutral, dried and concentrated. The resulting oil crystallized upon the addition of a small amount of methanol and yielded methyl reserpate.

The reserpine employed as the starting material can be obtained in the following manner as described in the above mentioned application Serial 367,357:

7,000 parts by weight of powdered bark from the root of Rauwolfia serpentina Benth, are percolated with about 35,000 parts by volume of methanol. After evaporating the methanol extract, 1,050 parts by weight are obtained of a dark colored powder which is treated several times with water for removal of soluble constituents. The insoluble residue remaining from this operation is subsequently masticated five times, in each case with 1,500 parts by volume of 10% aqueous acetic acid, the solution being best separated from the smeary residue by centrifuging. The brown acetic acid solution, which for further working up can be concentrated at low temperature to a small volume or be diluted with half the volume of water, possesses a pH of about 3.9. This solution is extracted by shaking with 3,500–4,000 parts by volume of chloroform divided into 3–4 portions. These chloroform extracts are washed once with potassium carbonate solution and twice with water, dried with sodium sulfate and evaporated to dryness under reduced pressure. The residue, amounting to 70–80 parts by weight, forms a green brown colored powder. For further purification, this residue is dissolved in benzene and chromatographed over 1,000–1,200 parts by weight of neutral aluminum oxide (activity II–III according to Brockmann). On elution with benzene there are first obtained small quantities of a yellow oil and 0.9 part by weight of an inactive crystallizate of melting point 238–239° C., after which the substance of sedative activity follows. As soon as the major quantity of the active substance has been eluted, further elution is carried out with a mixture of 2 parts by volume of benzene and 1 part by volume of acetone. In this manner the residue of the sedative substance is obtained and after that a further inactive crystallizate of melting point 141–143° C. The eluate fractions containing the sedative substance are evaporated to dryness. By recrystallization of the residue from hot acetone or a mixture of chloroform and ether, 6.5–7 parts by weight of reserpine are obtained in the form of almost colorless crystals of melting point 262–263° C. (with decomposition); $[\alpha]_D^{23}$ —118° (in chloroform).

What is claimed is:

1. A method for preparing an alkyl reserpate which comprises treating reserpine with an excess of a lower alkanol in the presence of an alkali metal alkanolate under substantially anhydrous conditions.

2. A method for preparing methyl reserpate which comprises treating reserpine with an excess of methanol in the presence of sodium methylate under substantially anhydrous conditions.

3. A method for preparing methyl reserpate which comprises treating reserpine with an excess of methanol in the presence of piperidine under substantially anhydrous conditions.

4. A method for preparing methyl reserpate which comprises treating reserpine with an excess of methanol in the presence of sodium carbonate under substantially anhydrous conditions.

5. A method for preparing methyl reserpate which comprises treating reserpine with an excess of methanol in the presence of aluminum tertiary butoxide under substantially anhydrous conditions.

6. A method for preparing a lower alkyl reserpate which comprises subjecting reserpine to alcoholysis with a lower alkanol.

7. A process for preparing a lower alkyl reserpate which comprises subjecting reserpine to alcoholysis under substantially anhydrous conditions with a lower alkanol.

8. A process in accordance with claim 7, which is carried out in the presence of an alcoholysis catalyst.

References Cited in the file of this patent

Indian Journal of Pharmacy (Schroff), April–June 1941, pp. 59–61.

JACS, Koepfli, vol. 54, June 1932, pp. 2412–2418.

Chatterjee: Sci. and Culture, vol. 17, p. 139 (1951).